United States Patent [19]
Fox et al.

[11] Patent Number: 4,998,586
[45] Date of Patent: Mar. 12, 1991

[54] HOOFED-ANIMAL SHOE PAD

[76] Inventors: Alfred E. Fox, P.O. Box 231, Newton, Mass. 02166; James B. Boulton, 16 Kingsview Rd., Marlborough, Mass. 01752

[21] Appl. No.: 411,409

[22] Filed: Sep. 22, 1989

[51] Int. Cl.⁵ .............................................. A01L 7/02
[52] U.S. Cl. ........................................ 168/12; 168/14
[58] Field of Search ............................ 168/12, 14, 28

[56] References Cited

U.S. PATENT DOCUMENTS

| | | | |
|---|---|---|---|
| 479,912 | 8/1892 | Mooney | 168/12 |
| 2,705,536 | 4/1955 | Phreaner | 168/14 |
| 3,747,684 | 7/1973 | Wallen | 168/28 |
| 4,513,825 | 4/1985 | Murphy | 168/12 |
| 4,565,250 | 1/1986 | Vasko | 168/12 |

FOREIGN PATENT DOCUMENTS

| | | | |
|---|---|---|---|
| 326984 | 6/1935 | Italy | 168/28 |
| 339131 | 12/1930 | United Kingdom | 168/28 |

OTHER PUBLICATIONS

Hoof Prints, Inc., product literature.

Primary Examiner—Robert P. Swiatek
Attorney, Agent, or Firm—Fish & Richardson

[57] ABSTRACT

A resilient pad to be placed between a foot and a shoe of a hoofed animal, the pad including a first plastic polymer having a first durometer, and a second plastic polymer having a second durometer higher than the first durometer is disclosed, wherein when the pad is in position between the foot and the shoe, the first plastic polymer is simutaneously in contact with the second plastic polymer and the shoe, and the second plastic polymer is in contact with the first plastic polymer and free of contact with the foot.

8 Claims, 2 Drawing Sheets

HOOFED-ANIMAL SHOE PAD

BACKGROUND OF THE INVENTION

This invention relates to pads to be used with shoes for animals, e.g., horses.

A resilient pad is frequently inserted between a hoof of a horse and a metal horseshoe to act as a shock absorber when the horse's hoof and the horseshoe strike the ground. Horseshoe pads come in a variety of sizes and designs. A flat all-purpose pad covers the sole of the horse's foot completely while a rim pad is designed in the shape of the horseshoe under which it fits. Other designs are known for therapeutic purposes.

SUMMARY OF THE INVENTION

In general, the invention features a resilient pad to be placed between a foot and a shoe of a hoofed animal, the pad including a first plastic polymer having a first durometer, and a second plastic polymer having a second durometer higher than the first durometer, wherein when the pad is in position between the foot and the shoe, the first plastic polymer is simultaneously in contact with the second plastic polymer and the shoe, and the second plastic polymer is in contact with the first plastic polymer and free of contact with the foot.

In preferred embodiments the first plastic polymer is also simultaneously in contact with the foot, the second plastic polymer is also free of contact with the ground, both the first and second polymers are moldable polyurethane, and the second polymer is configured in the form of a stiffening frame in which a first portion substantially conforms to the shape of the shoe and other portions are substantially orthogonal to the first portion. The pad can conform substantially to the surface area of the shoe.

A horseshoe pad composed of plastic polymers of different durometers, in which the lower durometer polymer is in contact with the horseshoe, both absorbs and dissipates impact related shock while at the same time showing excellent strength and durability. The lower durometer plastic polymer is subjected to limited compression under the weight of the animal, and the energy from the impact related shock is dissipated through the higher durometer plastic polymer.

Other features and advantages of the invention will be apparent from the following description and from the claims when read in connection with the accompanying drawings in which:

DRAWINGS

STRUCTURE AND FABRICATION

Figure 1:
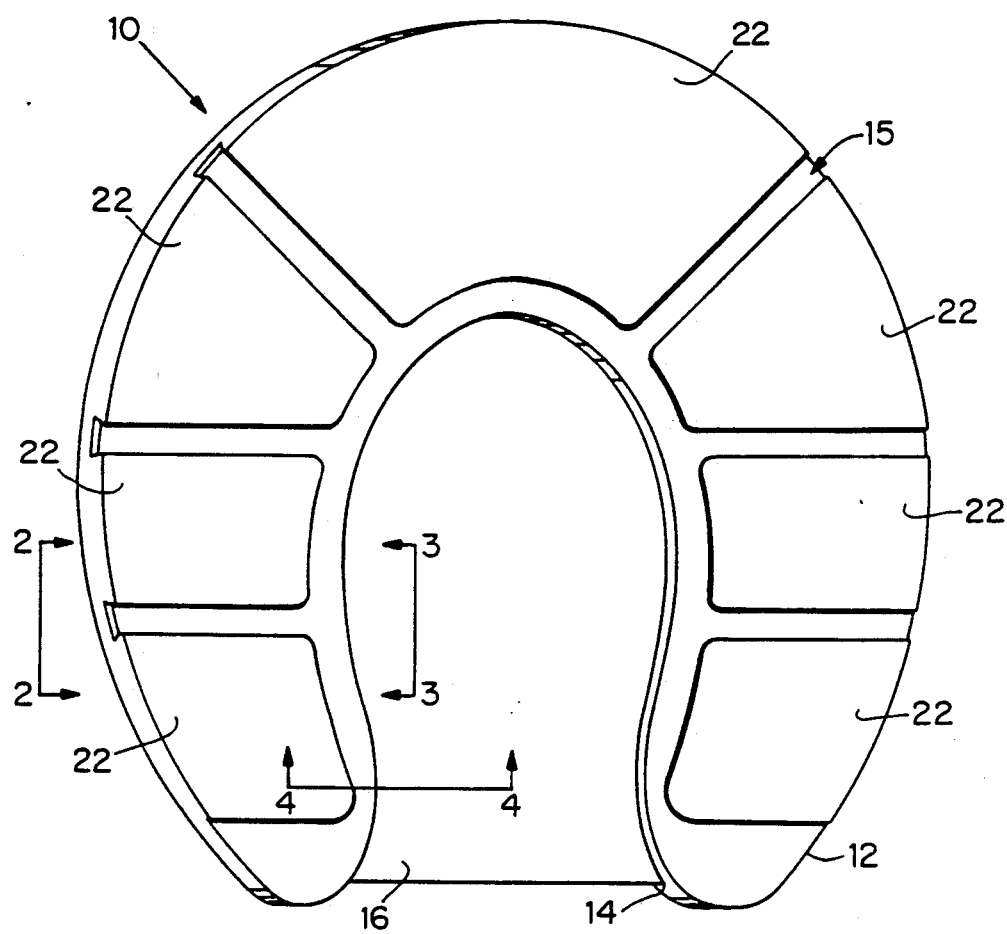
FIG. 1 is a view of the turf side of a full coverage horseshoe pad.
Figure 2:
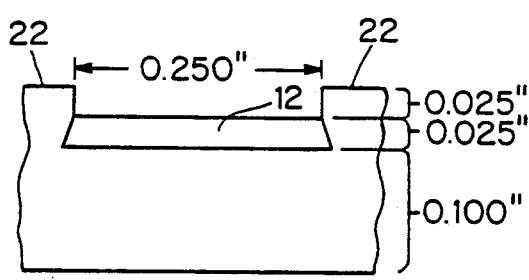
FIG. 2 is a view taken at line 2—2 of FIG. 1.
Figure 3:
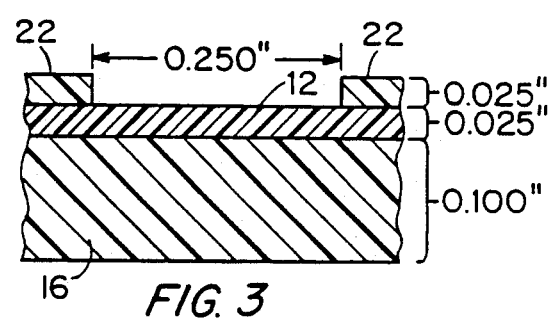
FIG. 3 is a section taken at line 3—3 of FIG. 1.
Figure 4:
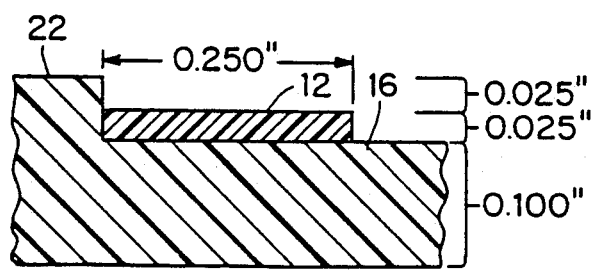
FIG. 4 is a section taken at line 4—4 of FIG. 1.

Referring to FIGS. 1-4, shock absorbing horseshoe pad 10 consists of a primary frame 12, injection molded from a high durometer plastic polymer such as 98A polyurethane (Dow Chemical Corporation). The frame has an interior arched portion 14 with radially projecting arms 15, each portion of the frame being approximately 0.025 inches thick and 0.250 inches wide. Arms 15 taper outward slightly, from the top, along their length and reach to the outer margins of the formed pad 10.

Primary frame 12 is overmolded by standard procedures (at a temperature sufficient to promote minimum melting of the surface of the frame and thus assure adherence) with a lower durometer plastic polymer such as 70A polyurethane, to create the contact surfaces of the horseshoe pad. The rear surface 24 of the lower durometer material, which is placed in contact with the horse's foot, is flat. The upper or turf side surface, part of which is placed in contact with an affixed horseshoe (as is described in detail below), contains center portion 16 (0.100 inches thick) which fills the interior of frame arch 14, and, spaced between radial arms 15, raised areas 22, each of which extends approximately 0.025 inches above the upper surface of radial arms 15 and central arch 14. Thus, surface 24, center portion 16, and raised areas 22 form one continuous unit of lower durometer material.

Alternatively, the lower durometer unit, consisting of surface 24, center portion 16, and raised areas 22, could be molded first, leaving recesses into which could be overmolded primary frame 12 of the higher durometer material. Either unit could be pour molded or die cut from a sheet of material, and the units could be attached together by solvent, heat, or ultrasonic bonding, or with an adhesive.

The polymers used in the shock absorbing horseshoe pad are preferably moldable, plastic, durable, and resilient. The higher durometer polymer is preferably as hard as practical while the lower durometer polymer is chosen so that it will flow somewhat under the compression from the weight of the horse without collapsing. Some suitable polymers for the invention are polyvinyl chloride and polyurethane and thermoplastic rubbers. The polymers in the pad may be different or may be of the same structure but of different durometers. Measures of hardness (durometer readings) are given by Shore A or Shore D units, two different scales which are used within the plastics industry.

USE

In use, rear surface 24 of the horseshoe pad is placed against the horse's foot and the horseshoe is applied over the pad so that the shoe comes in contact with raised areas 22 on the turf side of the pad. Any edges of the pad which extend out beyond the horseshoe are trimmed to fit in a conventional manner. If desired, the center portion of the pad or any segment thereof could easily be removed with conventionally available tools prior to or after application. As a horse shod in this manner runs, the horse's weight causes the lower durometer polymer to flow somewhat, i.e., there is limited compression of the polymer, thus dissipating the shock of the impact and reducing the stresses on the bones and ligaments of the foot and leg. The higher durometer frame of the pad both provides necessary rigidity to the pad and acts as a damper for dissipating energy transmitted by the lower durometer material, preventing it from being reabsorbed by the horse's foot.

Figure 5:
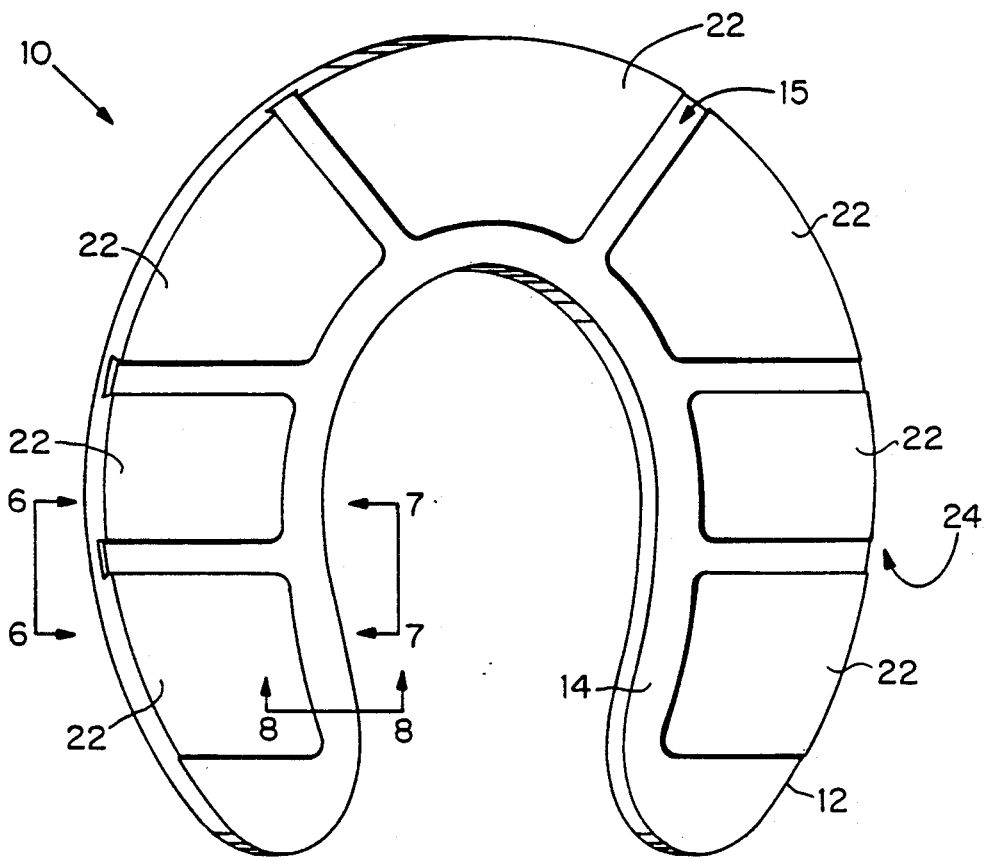
FIG. 5 is a view of the turf side of a rim horseshoe pad.
Figure 6:
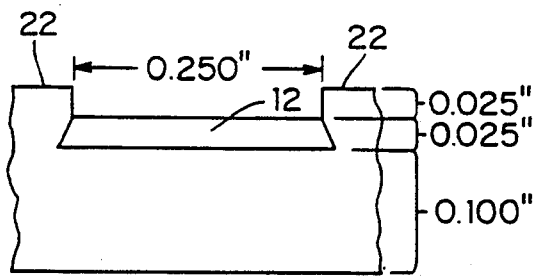
FIG. 6 is a view taken at line 6—6 of FIG. 5.
Figure 7:
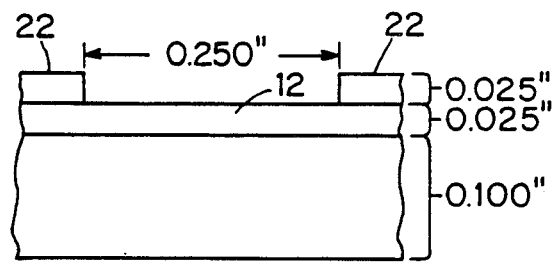
FIG. 7 is a section taken at line 7—7 of FIG. 5.
Figure 8:
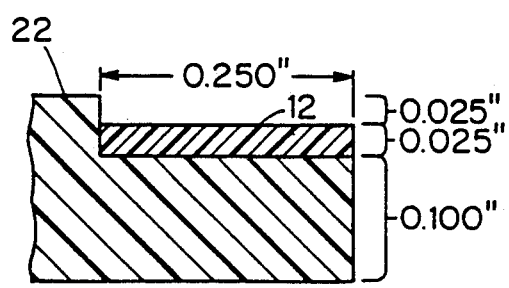
FIG. 8 is a section taken at line 8—8 of FIG. 5.

Other embodiments are within the following claims. For example, FIGS. 5-8 show a rim pad according to the invention that fits under just the horseshoe, i.e , does not cover the foot frog area. The arch portion 14 of frame 12 could run along the outer edge of the horseshoe pad or any distance in from the outer edge. Radial arms 15 may be configured in any arrangement or have any form desired as long as defined spaces are created to receive the lower durometer polymer. Any configuration of higher and lower durometer polymers which will place the lower durometer polymer in contact with the horseshoe when the pad is in position, while the higher durometer polymer is in contact with the lower durometer polymer but not in contact with the horse's hoof is suitable for carrying out the invention.

We claim:

1. A resilient pad to be placed between a foot and a shoe of a hoofed animal, said pad comprising
    a first plastic polymer having a first durometer, and characterized by absorbing significant energy from impact-related shock, and
    a second plastic polymer having a second durometer higher than said first durometer and characterized by dissipating significant energy from impact-related shock, wherein when said pad is in position between said foot and said shoe, said first plastic polymer is simultaneously in contact with said foot, said second plastic polymer and said shoe, and said second plastic polymer is in contact with said first plastic polymer and free of contact with said foot so that said first plastic polymer is subjected to limited compression and may flow somewhat under the weight of said animal allowing absorbing significant energy from impact-related shock while said second plastic polymer dissipates energy from impact-related shock transmitted by said first polymer to prevent the energy thus dissipated from being reabsorbed by the foot of said animal to help reduce stresses on the bones and ligaments of the foot and leg of said hoofed animal.

2. The pad of claim 1 wherein said second plastic polymer is also free of contact with said shoe.

3. The pad of claim 1 substantially conforming to the surface area of said shoe.

4. The pad of claim 1 wherein one of said polymers is moldable.

5. The pad of claim 1 wherein both said first polymer and said second polymer are moldable.

6. The pad of claim 1 wherein said second polymer is configured in the form of a stiffening frame.

7. The pad of claim 6 wherein a first portion of said frame substantially conforms to the shape of said shoe and other portions of said frame are substantially orthogonal to said first portion.

8. The pad of claim 1 wherein said first plastic polymer and said second plastic polymer are polyurethane.

* * * * *